United States Patent

Powell, II et al.

[11] Patent Number: 6,130,921
[45] Date of Patent: Oct. 10, 2000

[54] FREQUENCY SHIFT MODULATION AUTOMATIC FREQUENCY CORRECTION CIRCUIT AND METHOD

[75] Inventors: Clinton C Powell, II, Lake Worth, Fla.; James Rodney Webster, Colorado Springs, Colo.

[73] Assignee: Motorola, Inc., Schaumburg, Ill.

[21] Appl. No.: 08/996,900

[22] Filed: Dec. 23, 1997

[51] Int. Cl.[7] .................................................. H04L 27/06
[52] U.S. Cl. .......................................... 375/344; 455/192.2
[58] Field of Search .................................... 375/316, 317, 375/287, 334, 335, 340, 344, 269, 272; 455/133, 164.1, 164.2, 182.2, 183.2, 192.2, 205; 329/300, 303

[56] References Cited

U.S. PATENT DOCUMENTS

| | | | |
|---|---|---|---|
| 5,394,441 | 2/1995 | Morera et al. | 375/327 |
| 5,425,056 | 6/1995 | Maroun et al. | 375/316 |
| 5,479,452 | 12/1995 | Hayes et al. | |
| 5,555,452 | 9/1996 | Callway et al. | 455/226.2 |
| 5,564,091 | 10/1996 | Goldinger | 455/226.2 |
| 5,566,213 | 10/1996 | Carsello | 375/344 |
| 5,627,860 | 5/1997 | McKinny et al. | 375/317 |
| 5,635,914 | 6/1997 | Petreye et al. | 340/825.44 |
| 5,670,951 | 9/1997 | Servilio et al. | 340/825.44 |
| 5,678,223 | 10/1997 | Callway et al. | 455/324 |
| 5,701,600 | 12/1997 | Wetters et al. | 455/208 |
| 5,930,307 | 7/1999 | Deluca | 375/340 |
| 5,949,827 | 9/1999 | DeLuca et al. | 375/324 |

*Primary Examiner*—Chi H. Pham
*Assistant Examiner*—Emmanuel Bayard
*Attorney, Agent, or Firm*—James A. Lamb

[57] ABSTRACT

A method (900) and circuit (400) for automatic frequency correcting a frequency modulated (FM) digital signal determines a frequency offset value of the detected FM signal during a preamble portion of the FM digital signal, generates an offset corrected signal by removing the frequency offset value from a detected FM signal (440), and generates a frequency corrected signal (460). The frequency corrected signal is generated by selecting the offset corrected signal during the preamble portion, selecting the detected FM signal after the end of the preamble portion when a magnitude of the frequency offset value of the detected FM signal is below a predetermined threshold (445), and otherwise selecting the offset corrected signal after the end of the preamble portion.

9 Claims, 9 Drawing Sheets

FREQUENCY SHIFT MODULATION AUTOMATIC FREQUENCY CORRECTION CIRCUIT AND METHOD

FIELD OF THE INVENTION

This invention relates in general to frequency correction techniques for frequency modulated (FM) radio signals and in particular to automatic frequency correction techniques used in radios that receive two level FM digital signals having a high modulation index.

BACKGROUND OF THE INVENTION

A known technique of increasing information throughput in synchronous signaling systems that communicate digital information is to use increased bit rates to communicate the information. Older wide area radio communication systems, such as systems using the POCSAG (Post Office Commission Standards Advisory Group) protocol, were designed to operate using two level frequency shift modulation at one bit rate for all systems, all the time. Newer systems, such as the well known FLEX™ family of signaling protocols licensed by Motorola, Inc., of Schaumburg, Ill., allow the use of bit rates selected from a set of predetermined bit rates. In the FLEX family of protocols, multilevel frequency shift modulation in the specific form of four level frequency shift modulation (hereafter referred to simply as four level modulation) is used for the highest bit rate (6400 bits per second (bps)), and can be used for 3200 bps.

Figure 1:
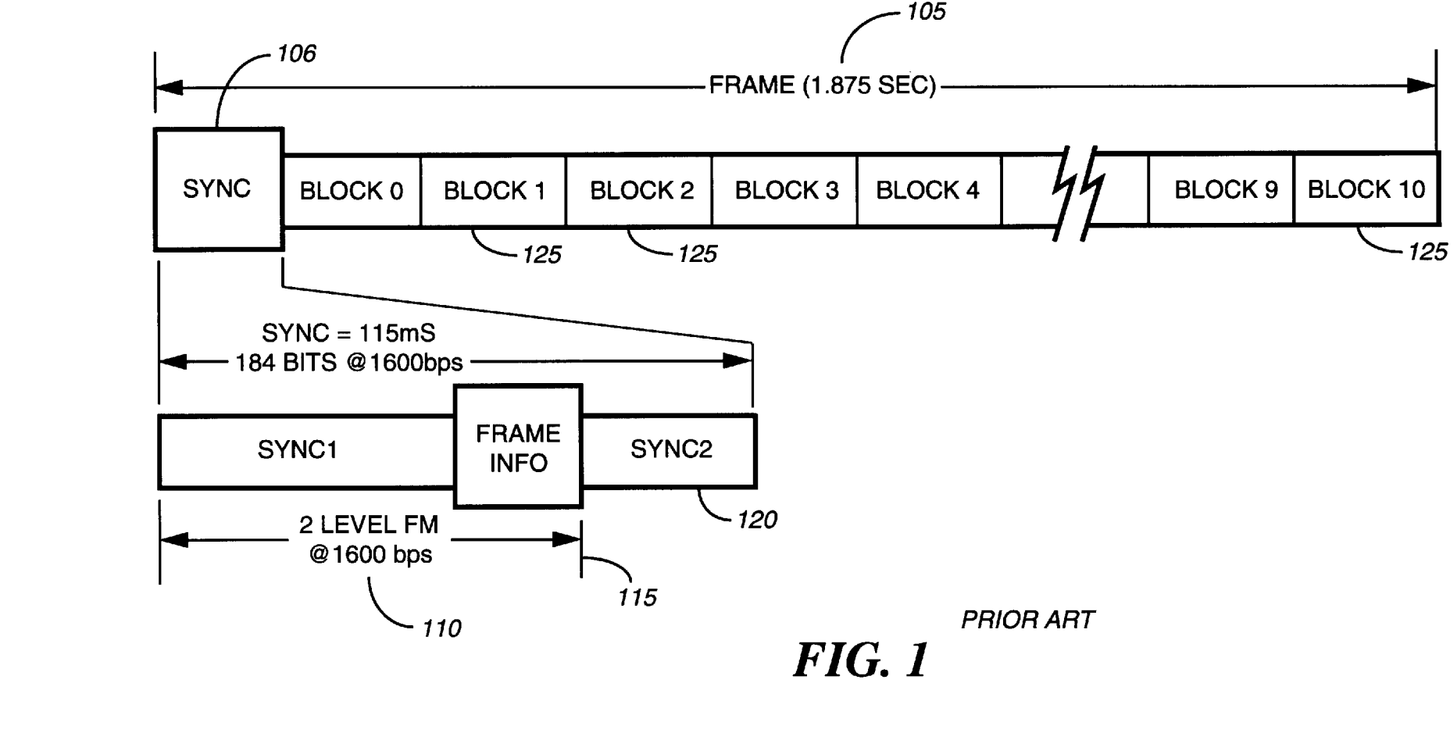
FIG. 1 is a timing diagram which illustrates features of the transmission format of a prior art FLEX signaling protocol used in a radio communication system, in accordance with the preferred embodiment of the present invention.

Referring to FIG. 1, a timing diagram is shown which illustrates features of the transmission format of the well known FLEX signaling protocol. The signaling protocol comprises a FLEX frame 105 that has a duration of 1.875 seconds. The FLEX frame 105 includes a synchronization (SYNC) portion 106 and eleven blocks 125, identified as blocks zero through ten. The SYNC portion 106 includes a preamble portion 110 and a SYNC 2 portion 120. The preamble portion 110 includes a SYNC 1 portion and a Frame Information Word. Synchronization and certain global information are transmitted in the preamble portion 110 using a preamble of 1600 bits per second (bps) with a two level frequency shift modulation, in which deviations of ±4800 Hertz are preferably used for the two frequency shift levels. The global information indicates to all receivers that receive the frame a bit rate and level of modulation at which the remainder of the frame 105 will be transmitted. The remainder of the frame comprises the SYNC 2 120 and the eleven blocks 125. A boundary 115 between the preamble portion 110 and the remainder of the frame is at the end of the preamble portion 110. The remainder of the frame can be transmitted using either two or four level frequency shift modulation at 1600 or 3200 symbols per second, resulting in bit rates of 1600, 3200 or 6400 bps.

A known technique used in a radio receiver for improving the sensitivity of receiving an FM digital radio signal sent at an actual carrier frequency that is offset from a nominal carrier frequency is to measure the offset in the receiver and use it to eliminate the offset. The nominal carrier frequency as used herein means the receive carrier frequency as referenced to the actual receiver injection frequency in the case of a conversion receiver, or the ideal transmitted carrier frequency in the event the receiver is a direct carrier demodulation receiver. In a digital signal that is frequency shift modulated, a technique commonly used to measure the offset is to measure the average frequency deviations of the frequency peaks and valleys and determine from them an average deviation, which essentially is the offset. When this technique for eliminating offset is used in a receiver having an intermediate frequency (IF) filter substantially optimized for receiving two level modulation in an system in which two level modulation is used and the modulation index (MI) is reasonably optimized (i.e., the MI is on the order of 1.0), an improvement of receiving sensitivity can be achieved over a range of offset amounts.

Figure 2:
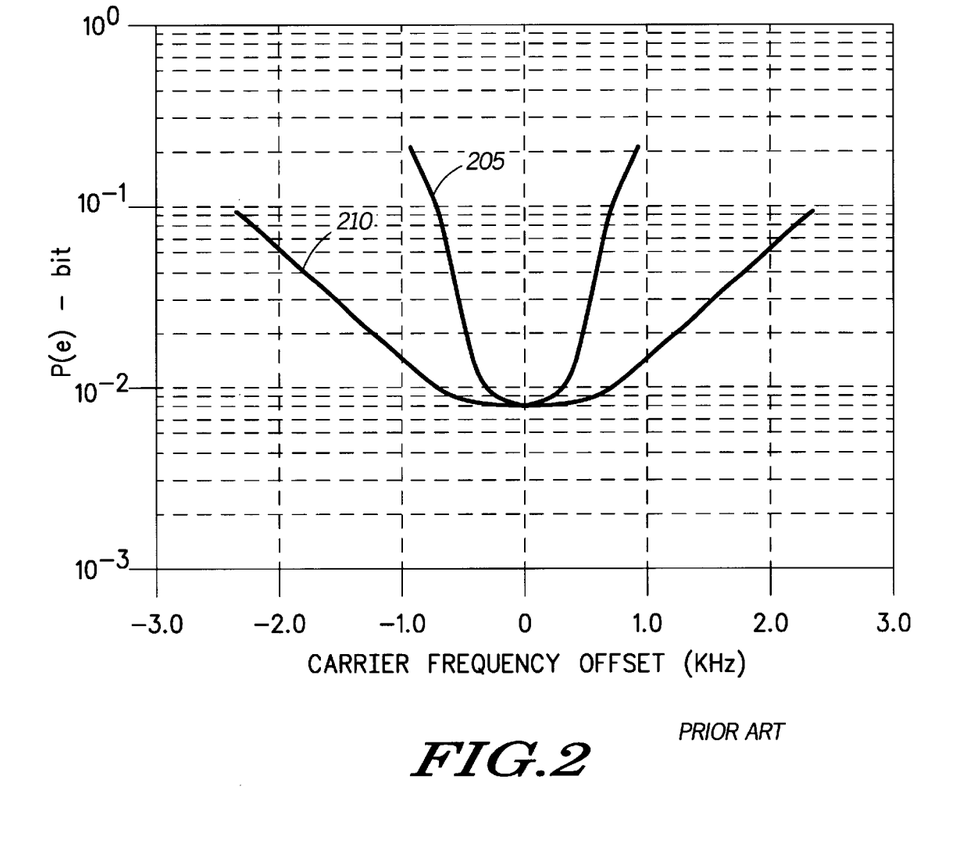
FIG. 2 is a graph which has two curves showing estimated receiving sensitivities of an exemplary prior art radio that is reasonably optimally designed to recover a digital signal in a communication system in which digital signals are transmitted using two level frequency shift modulation with a reasonably optimal modulation index.

Referring to FIG. 2, a graph is shown which has two curves showing estimated receiving sensitivities of a exemplary prior art radio that is designed to recover such a digital signal, for which the MI and the bandwidth of the receiver IF are reasonably optimized. Bit error rate is plotted, and represents the signaling sensitivity. Curve 205 illustrates the bit error rate versus the amount of frequency offset between the actual carrier frequency of the received digital signal and the nominal carrier frequency, without offset correction being used, for digital signals having random data. Curve 210 illustrates the bit error rate versus frequency offset f or the same digital signals when frequency offset is used. It will be appreciated that the use of frequency offset correction provides substantial bit error rate improvement compared to not using frequency correction.

The situation can be different in a receiver that has an IF filter that is optimized for multilevel signaling, such as the four level signaling used in the FLEX family of protocols. In such a receiver, the use of frequency offset correction can cause a degradation of bit error rate (and, therefore also the signaling sensitivity) when a two level signal is received in which the MI is not reasonably optimal.

Thus, what is needed is a technique for providing improved signaling sensitivity in a receiver designed to receive signals having multiple levels of frequency shift modulation, such as two and four level modulation.

DETAILED DESCRIPTION OF THE DRAWINGS

Figure 3:
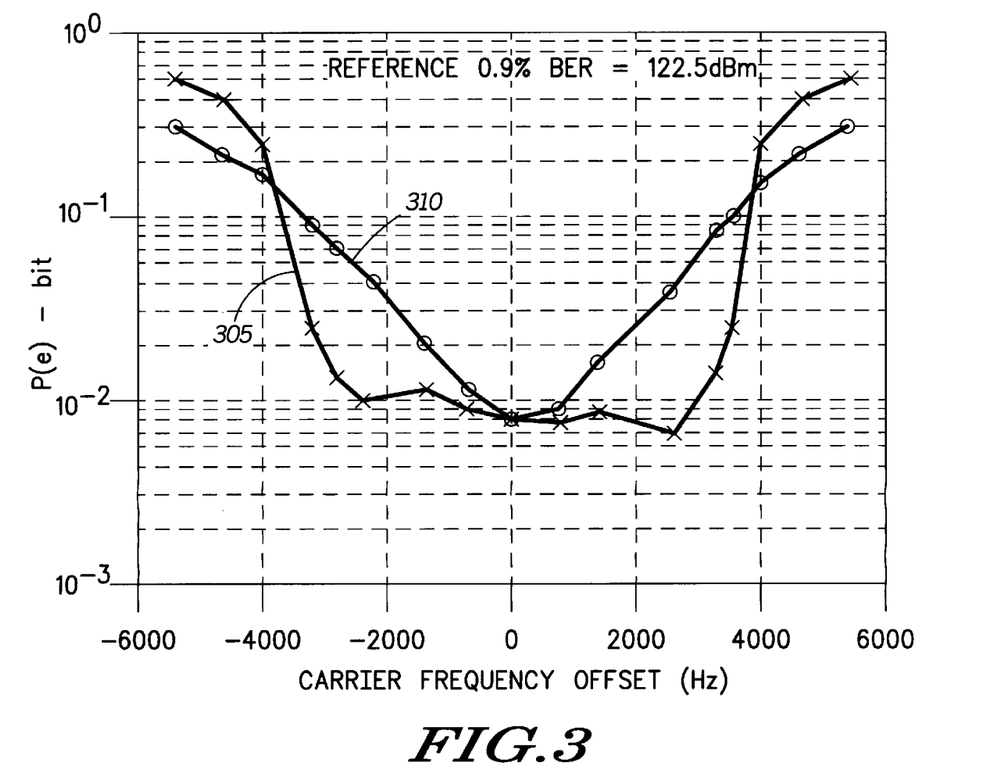
FIG. 3 is a graph that shows receiving sensitivity curves of a radio that is designed in accordance with prior art design principles to recover digital signals in a system that transmits the digital signals to the radio modulated with either two or four level frequency shift modulation.

Referring to FIG. 3, a graph is shown that has two curves that plot the measured receiving sensitivity (in the form of bit error rate) of a radio that is designed in accordance with prior art design principles to recover digital signals in a system that transmits the digital signals to the radio modulated with either two or four level frequency shift modulation. The IF filter of a receiver in the radio is designed, using conventional digital filter design techniques, to pass both two level and four level frequency shift modulation, with two frequency shift levels being at ±4800 Hertz for recovering both two and four level modulation. (Two additional frequency shift levels of ±1600 are used exclusively for four level modulation). Curve 305 is a plot of the bit error rates versus received carrier frequency offset during the reception of remainders of FLEX frames comprising random data (otherwise described herein as digital signals), when the digital signals that are received have been transmitted using two level modulation at ±4800 Hertz deviation, and the symbol rate is 3200 symbols per second. It will be appreciated that the modulation index (MI) in this circumstance is 3, which is not reasonably optimal. Curve 310 is a plot of the bit error rate versus the received carrier frequency offset when the same digital signals are received and conventional frequency offset correction is used. It will be appreciated that in this case, the bit error rate of the digital signals when no frequency correction is used is better than the bit error rate of the digital signals when frequency correction is used, for offsets less than approximately 3750 Hertz. The difference at the lower offset frequencies is attributed to a relatively wide separation of energy concentrations of the spectrum of the random digital signals (as indicated by the high MI of 3) and the effect on such separated energy spectrums by the IF filter when the actual receiver carrier frequency is offset from the nominal carrier frequency.

Figure 4:
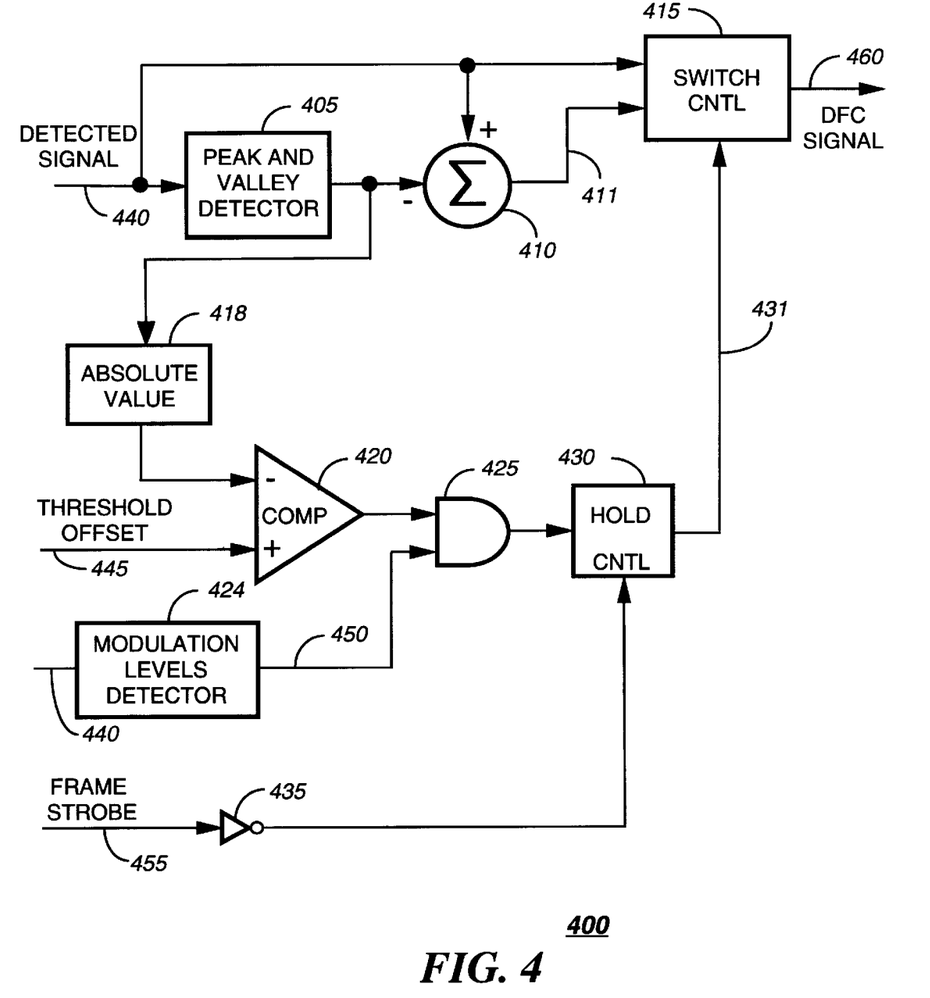
FIG. 4 is an electrical block diagram of a portion of digital frequency correcting (DFC) circuit of a radio that is designed to recover digital signals transmitted using a FLEX protocol in a radio communication system, in accordance with the preferred embodiment of the present invention.

FIG. 4 is an electrical block diagram of a digital frequency correction (DFC) circuit 400 of a radio 700 (FIG. 7) that is designed to recover digital signals transmitted using the FLEX protocol by a radio communication system, in accordance with the preferred embodiment of the present invention. The digital signal is modulated with either two or four level frequency shift modulation. The DFC 400 comprises a peak and valley detector 405, an adder 410, a switch 415, an absolute value generator 418, a comparator 420, a modulation levels detector 424, an AND gate 425, a HOLD latch 430, and an inverter 435. A detected signal 440 is generated by a conventional receiver 704 (FIG. 7) that has an IF filter designed to pass FLEX digital signals having either two or four level modulation, at symbol rates of 1600 and 3200 bits per second, as described above with reference to FIG. 1. The detected signal 440, which is a conventional voltage representation of an amount of instantaneous frequency deviation from a nominal carrier frequency generated within the receiver 704, is coupled to the peak and valley detector 405, wherein the average peaks and valleys of the detected signals are determined, and from which an offset value is determined, in a conventional manner. The offset value is a direct current (DC) voltage that represents the average offset frequency. The offset value is coupled to the adder 410 and to the comparator 420. The adder 410, to which the detected signal 440 is also coupled, subtracts the offset value from the detected signal 440, generating an offset corrected signal 411 that is coupled to the switch 415. Also coupled to the switch 415 is the detected signal 440. The switch 415 selects either the offset corrected signal 411 or the detected signal 440 to be coupled to a demodulator portion (not shown herein) of a controller 705 (FIG. 7) of the radio 700 as a digital frequency controlled signal 460, as determined by a hold signal 431 generated by the HOLD latch 430. The switch 415 selects the offset corrected signal 411 when the hold signal 431 is in the unasserted state (low, or binary 0) and selects the detected signal 440 when the hold signal 431 is in the asserted state (high, or binary 1). This action is described herein as removing the frequency offset when the offset corrected signal 411 is selected and as not removing the frequency offset when the detected signal 440 is selected. It will be appreciated that a digital value representing a DC voltage representing the frequency offset is what is actually removed or not removed from the detected signal 440, in accordance with the preferred embodiment of the present invention, as will be described more fully below.

In accordance with the preferred embodiment of the present invention, the offset value is also coupled to the absolute value generator 418, that generates the absolute value (or magnitude) of the offset value and couples the magnitude to the comparator 420. Also coupled to the comparator 420 is a threshold 445, which in accordance with the preferred embodiment of the present invention is a value that represents 3200 Hz of offset. When the magnitude of the offset value falls below the threshold 445, the comparator generates a comparator output signal having an asserted state, that is coupled to the AND gate 425.

The detected signal 440 is coupled to an input of the modulation levels detector 424, and from the detected signal 440 the modulation levels detector 424 makes a determination as to whether the remainder of the frame will be transmitted to the radio 700 using two level or four level modulation and generates a 2 level—4 level signal 450 having an asserted state for a short duration that lasts through the end of the preamble portion 110 when a determination is made that 2 level modulation will be transmitted. Otherwise, the modulation levels detector 424 generates the 2 level—4 level signal 450 having a unasserted state through the end of the preamble portion 110. The 2 level—4 level signal 450 is coupled to a second input of the AND gate 425. When the 2 level—4 level signal 450 and the comparator output signal are both in the asserted state, AND gate 425 generates a signal having an asserted state that is coupled to the HOLD latch 430. The HOLD latch 430 generates an unasserted state during the preamble portion 110 of the FM digital signal, so as to couple the offset corrected signal 411 to the digitally frequency corrected signal 460 during the preamble portion 110. The offset corrected signal 411 is preferably selected during the preamble portion 110 because the detected signal 440 in some instances can have a large offset, which if left uncorrected would result in a failure to recover the signal during the preamble portion 110. A frame strobe 455 is coupled through an inverter 435 to a control input of the HOLD latch 430. The frame strobe 455 is a signal having an asserted state of short duration at the end of the preamble portion 110. When the output of the AND gate 425 is asserted during the short asserted state of the frame strobe 455, the HOLD latch keeps the hold signal 431 in the asserted state throughout the remainder of the frame. On the other hand, when the output of the AND gate 425 is unasserted during the short asserted state of the frame strobe 455, the HOLD latch keeps the hold signal 431 in the unasserted state throughout the remainder of the frame.

Thus, when the frequency offset of the received carrier is less than the threshold 445 at the end of the preamble portion 110 and the number of modulation levels in the remainder of the frame are determined to be two, the detected signal 440 is used for the digitally frequency corrected (DFC) signal 460. When, on the other hand, the frequency offset of the received carrier is greater than the threshold 445 at the end of the preamble portion 110 or the number of modulation levels in the remainder of the frame is determined to be greater than two, the offset corrected signal 411 is used for the digitally frequency corrected signal 460.

Figure 5:
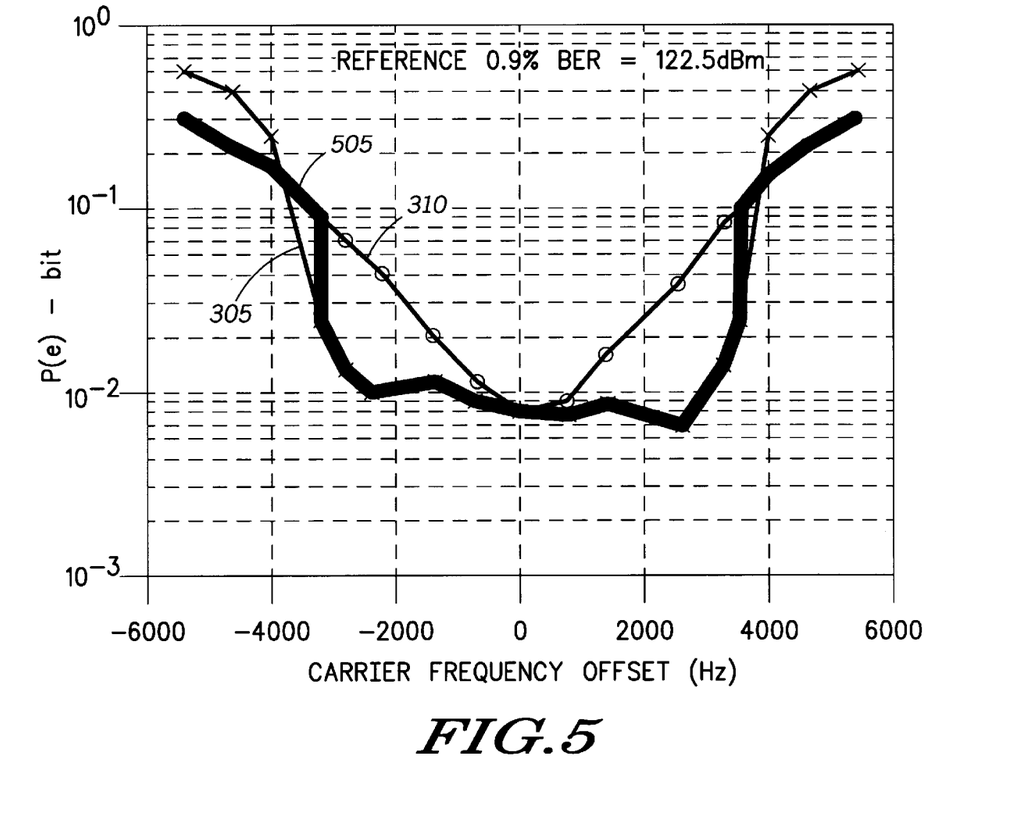
FIG. 5 is a graph that shows receiving sensitivity curves of the radio that comprises the DFC described with reference to FIG. 4, when digital signals having two level modulation is received, in accordance with the preferred embodiment of the present invention.

FIG. 5 is a graph that shows receiving sensitivity curves of the radio 700 that comprises the DFC 400 described with reference to FIG. 4, when digital signals having two level modulation are received, in accordance with the preferred embodiment of the present invention. Curve 505 shows the receiving sensitivity of the radio 700, and is derived from curves 305 and 310 of FIG. 3, with a switchover point at 3200 Hertz. Curves 305 and 310 of FIG. 3 are shown for reference. It will be appreciated that the unique DFC 400 provides the improved receiving sensitivity (bit error rate) in both the lower frequency offset range between −3200 Hertz and +3200 Hertz attained by not performing an offset correction, and also improvements beyond ±3200 Hertz offsets attained by performing frequency offset correction.

Figure 6:
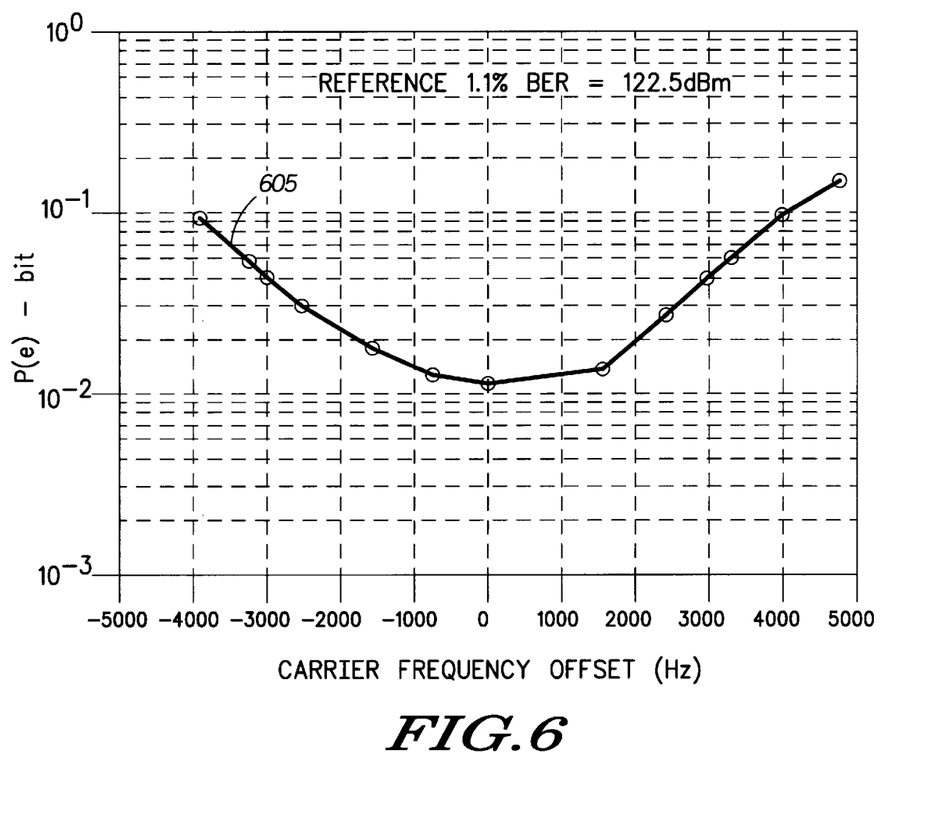
FIG. 6 is a graph that shows typical receiving sensitivity curves of the radio that comprises the DFC described with reference to FIG. 4, when digital signals of four level modulation are received, in accordance with the preferred embodiment of the present invention.

FIG. 6 is a graph that shows a typical receiving sensitivity curve of the radio 700 that comprises the DFC 400 described with reference to FIG. 4, when digital signals of four level modulation are received, in accordance with the preferred embodiment of the present invention. Curve 605 a curve of bit error rate versus received carrier frequency offset that is derived from bit error rates measured during the reception of remainders of FLEX frames comprising random data, using the radio 700 having an IF designed for passing both the two level and four level modulations of digital signals modulated according to a FLEX signaling protocol. Because the DFC 400 will always select the offset corrected signal when four level modulation is detected, curve 605 is equivalent to a signaling sensitivity curve of a radio using prior art automatic frequency control.

Figure 7:
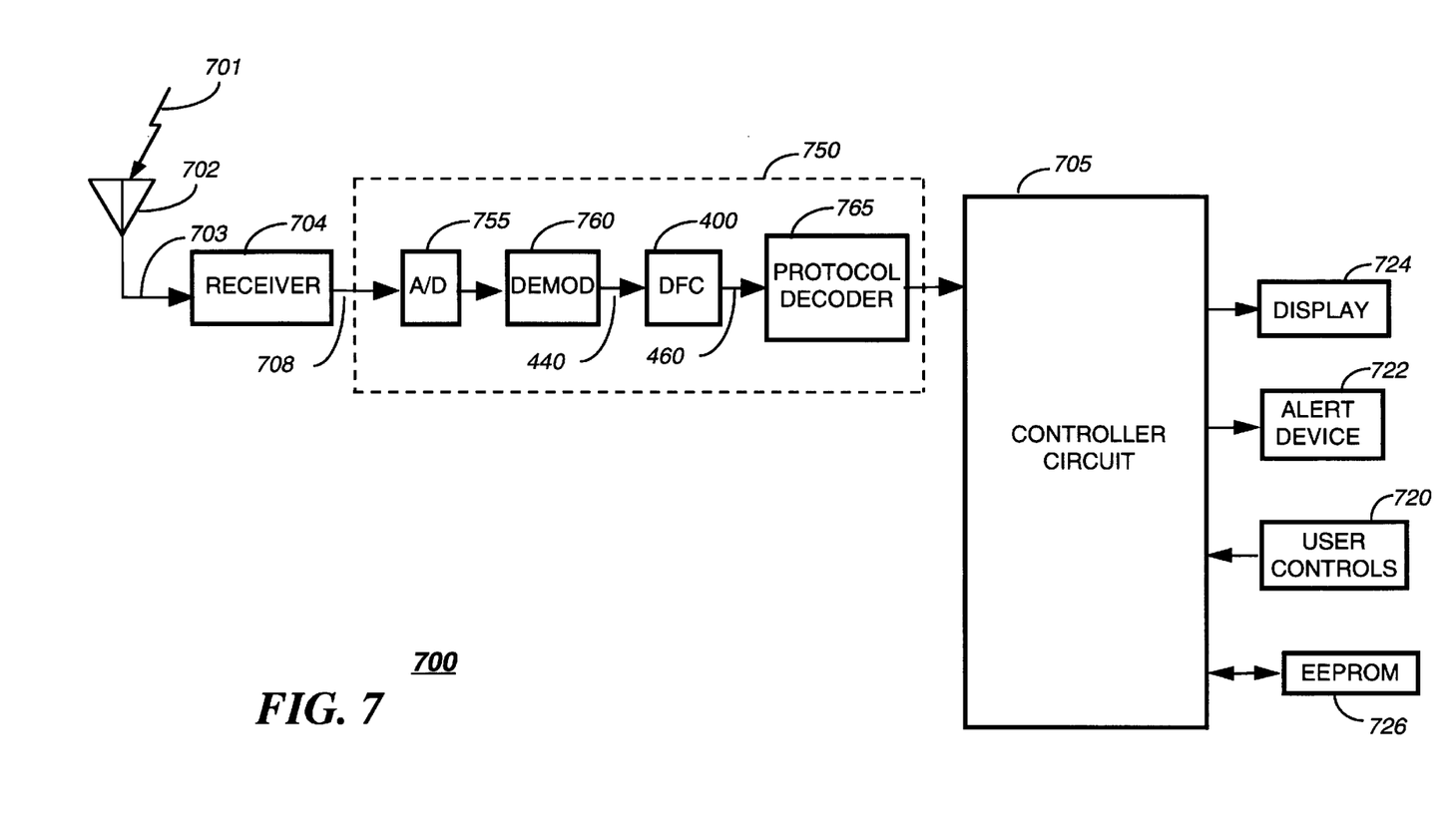
FIG. 7 is an electrical block diagram of the radio that comprises the DFC described with reference to FIG. 4, in accordance with the preferred embodiment of the present invention.

Referring to FIG. 7, an electrical block diagram of the radio 700 that comprises the DFC 400 described with reference to FIG. 4 is shown, in accordance with the preferred embodiment of the present invention. The radio 700 is a selective call radio that includes a conventional antenna 702 for intercepting a radiated signal 701. The antenna 702 converts the radiated signal 701 to a conducted radio signal 703 that is coupled to a conventional receiver 704 wherein the conducted radio signal 703 is converted from a radio frequency (RF) signal to an intermediate frequency (IF) signal 708, which is at 140 kHz, in accordance with the preferred embodiment of the present invention. The IF signal 708 is coupled to a demodulator/protocol circuit 750, which comprises an analog to digital converter (A/D) 755, a demodulator (DEMOD) 760, the DFC 400, and a protocol decoder 765. The A/D decoder converts the IF signal into a series of digital samples at an oversampling rate of 16×, which are coupled to the demodulator 760 wherein a digital demodulation is performed, resulting in a series of digital samples which is the detected signal 440 and which is representative of an analog detector waveform. The DFC 400 generates the digital frequency controlled signal 460, which is coupled to the protocol decoder 765, wherein the signal is synchronized to protocol bit and word clocks, and error decoding is performed, resulting in series of binary words that are coupled to a controller circuit 705. The controller circuit 705 is coupled to a display 724, an alert 722, a set of user controls 720, and an electrically erasable read only memory (EEPROM) 726. The controller 705 is coupled to the EEPROM 726 for loading an embedded address during normal operations of the radio 700.

A message processor function of the controller 705 processes an outbound message when an address received in the address field of an outbound signaling protocol matches the embedded address stored in the EEPROM 726, in a manner well known to one of ordinary skill in the art for a selective call radio. An outbound message that has been determined to be for the radio 700 by the address matching is processed by the message processor function according to the contents of the outbound message and according to modes set by manipulation of the set of user controls 720, in a conventional manner. An alert signal is typically generated when an outbound message includes user information. The alert signal is coupled to the alert device 722, which is typically either an audible or a silent alerting device.

When the outbound message includes alphanumeric or graphic information, the information is displayed on the display 724 in a conventional manner by a display function at a time determined by manipulation of the set of user controls 720.

The demodulator/protocol circuit 750 is a single integrated circuit comprising conventional logic circuit blocks that have been uniquely intercoupled using conventional integrated circuit design techniques, and is thus best described as a state machine that performs the circuit functions described above with reference to FIGS. 4 and 7, using a digital signal processing approach. The controller 705 comprises a microprocessor of the MC68HC11 family of microprocessors manufactured by Motorola, Inc. of Schaumburg, Ill. It could alternatively be a member of another conventional processor family.

Figure 8:
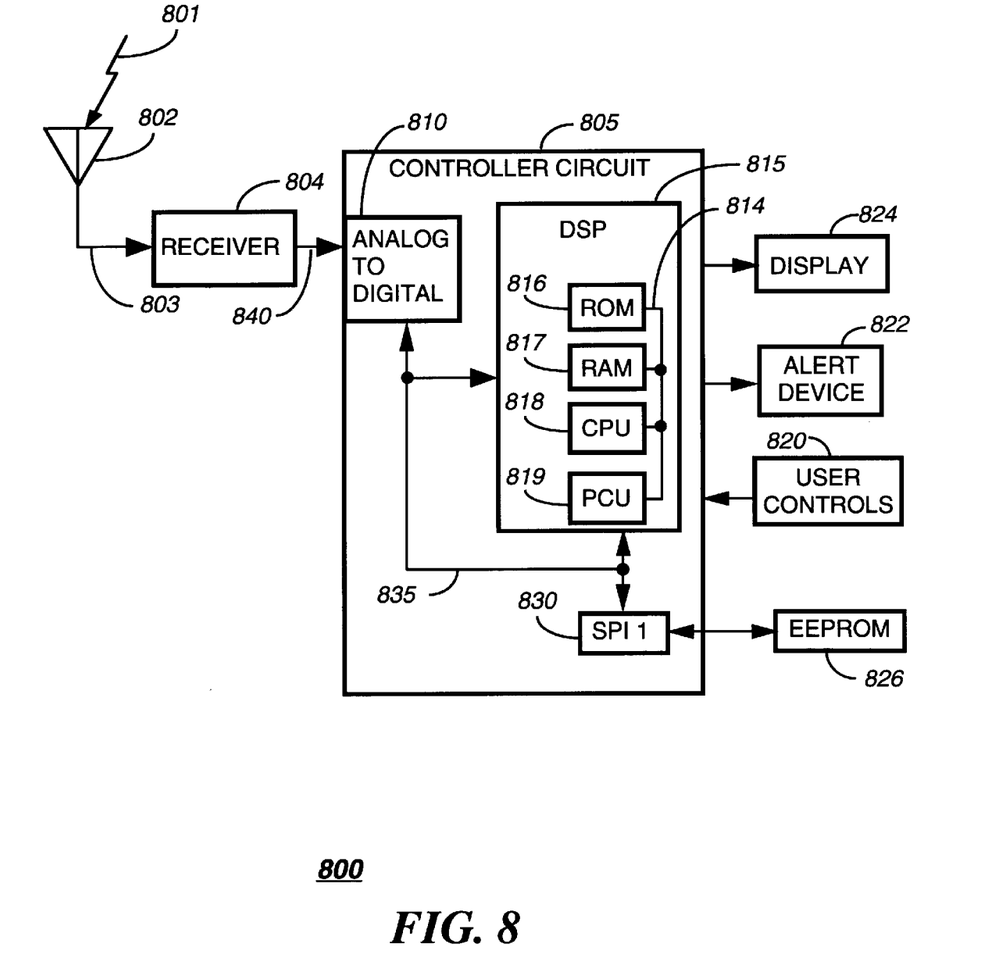
FIG. 8 is an electrical block diagram of a radio that performs the same DFC functions described with reference to FIG. 4, in accordance with an alternative embodiment of the present invention.

Referring to FIG. 8, an electrical block diagram of a radio 800 that performs the functions described for the DFC 400 with reference to FIG. 4 is shown, in accordance with an alternative embodiment of the present invention. The radio 800 is a selective call radio that includes a conventional antenna 802 for intercepting a radiated signal 801. The antenna 802 converts the radiated signal 801 to a conducted radio signal 803 that is coupled to a conventional receiver 804 wherein the conducted radio signal 803 is received in a conventional manner. The receiver 804 generates a detected signal 840 that is coupled to the controller circuit 805. In this case, the detected signal 840 is an analog signal that has the same value as the analog signal represented by the detected signal 440. The controller circuit 805 is coupled to a display 824, an alert 822, a set of user controls 820, and an electrically erasable read only memory (EEPROM) 826. The controller circuit 805 comprises an analog to digital converter (ADC) 810, a serial peripheral interface (SPI) 830, and a microprocessor (DSP) 815 which is coupled by the peripheral logic bus 835 to the ADC 810 and SPI 830. The demodulated signal 840 is coupled to the ADC 810 wherein it is converted to a series of digital samples that are coupled to the DSP 815. The SPI 830 is coupled to the EEPROM 826 for loading an embedded address during normal operations of the radio 800. The DSP 815 comprises a CPU 818, a peripheral control unit (PCU) 819, a read only memory (ROM) 816, and a random access memory 817 intercoupled by a CPU bus 814. The ROM 816 stores program instructions that control the CPU 818 and the RAM 817 provides temporary memory storage.

A message processor function of the DSP 815 provides the same functions as described for the message processor function of the controller 705.

All the parts are conventional but for the memory contents of the ROM 816. The ROM 816 has a set of masked program instructions that are uniquely designed to provide the advantages of the present invention. In particular, the peak and valley detector 405, the adder 410, the switch 415, the absolute value generator 418, the comparator 420, the modulation levels detector 424, the AND gate 425, the HOLD latch 430, and the inverter 435 are provided by operation of the CPU 818 under control of unique program instruction segments of the ROM 816, which performs the functions and couplings described with reference to FIGS. 4 and 8 by manipulation of the digital samples generated by the ADC 810. Although the CPU 818 is preferably a member of the ARM 7 family of RISC processors licensed from Advanced RISC Machine, Ltd. of Cambridge, Mass., it could alternatively be a member of another processor family that provides digital signal processor type of instructions.

It will be appreciated that the benefits of the present invention are also obtained in a radio that receives a digital signal having a modulation that is selected from one of more than just the two types of multi-level frequency shift modulation (two level and four level) described herein, when offset correction is disabled, when lower modulation levels are received, and an offset threshold is not exceeded. The radio in this case of an alternative embodiment of the present invention has a DFC that differs from the DFC 400 described above with reference to FIG. 4 only in that the modulation levels detector 424 generates a signal that substitutes for the 2 level—4 level signal 450 and that is asserted when the modulation level is determined to be two level and is unasserted when the modulation level is determined to be greater than two levels. This is then described as determining a number of modulation levels, M, of an M-ary FM digital signal.

Figure 9:
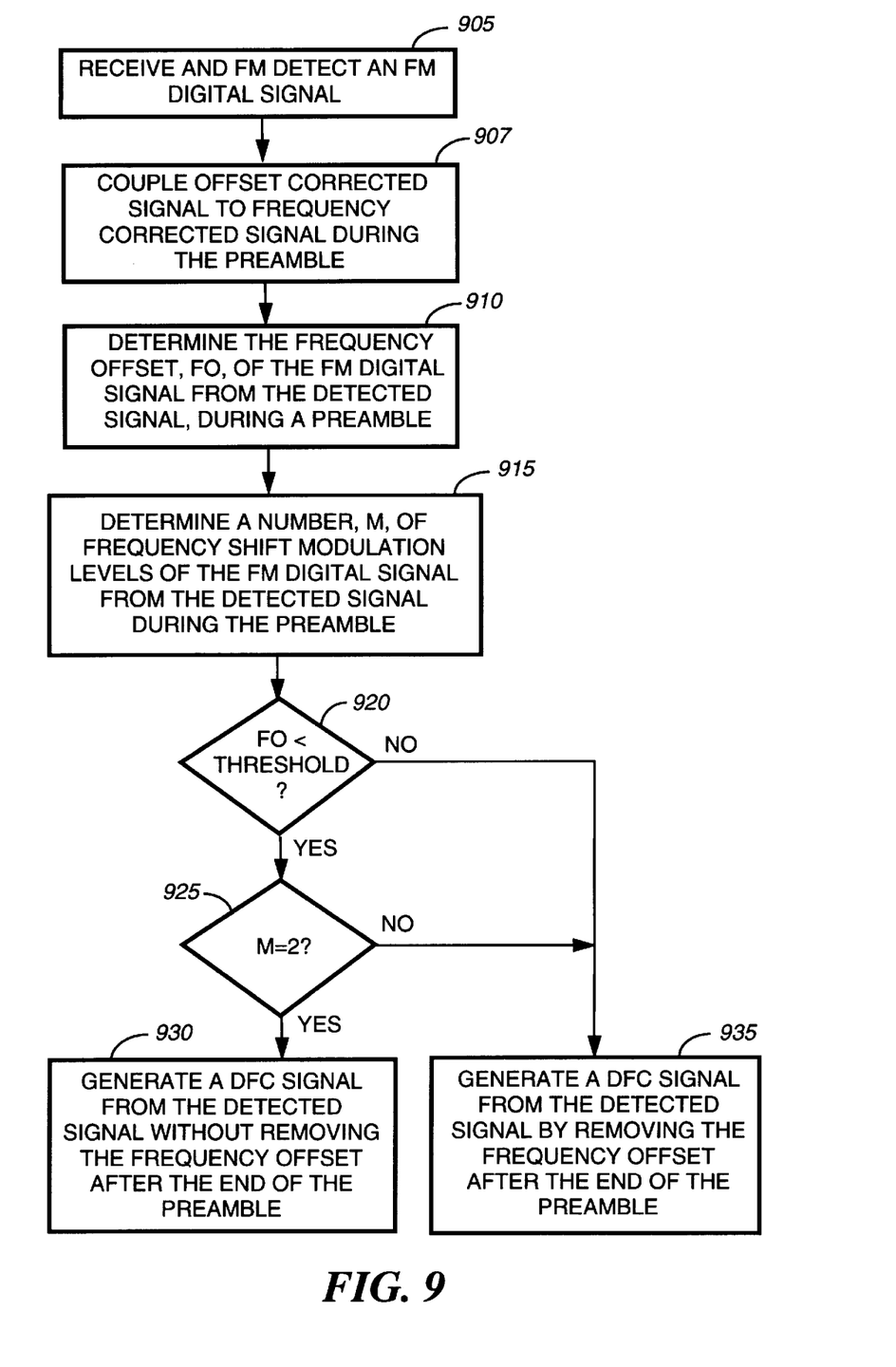
FIG. 9 is a flow chart of a method used in a radio that is designed to recover digital signals transmitted by a radio communication system using a multilevel frequency shift modulation protocol, in accordance with the preferred embodiment of the present invention.

FIG. 9 is a flow chart of a method 900 used in a radio for frequency correcting a frequency modulated (FM) digital signal 105, in accordance with the preferred embodiment of the present invention. The method is used in a radio designed to recover digital signals transmitted by a radio communication system using a frequency shift modulation protocol of M levels. At step 905, the FM digital signal 105 is received and FM detected. At step 907 the offset corrected signal 411 is coupled to the frequency corrected signal 460 during the preamble portion 110. At step 910, a frequency offset of the FM digital signal 105 is determined from the detected signal 440 during the preamble portion 110 of the FM digital signal 105. At step 915 a number of frequency shift modulation levels, M, of the FM digital signal is determined from the detected signal 440 during the preamble portion 110 of the FM digital signal 105. At step 920, when the FO determined at step 910 is below a predetermined threshold value, and when at step 925, M is not greater than 2, a digital frequency corrected (DFC) signal 460 is generated from the detected signal without removing the frequency offset. At step 920, when FO is greater than the predetermined threshold, or when at step 925 M is greater than 2, the DFC is generated from the detected signal by removing the frequency offset.

It will be appreciated that step 925 of the method described with reference to FIG. 8 can be optionally removed, when, for instance, a radio is designed with an IF filter that accommodates a signal that can be more that a two level frequency shift modulated signal, but which is to be used in a system that always uses two level signaling. Such could be the case for a paging radio designed for use in most systems using a FLEX protocol of the type described herein, but which is used in a slower speed system that only uses two level modulation. When step 925 is thus removed, step 930 is performed on the YES path. The effect of removing step 925 in the method described with reference to FIG. 8 is achieved in the DFC 400 by removing the modulation levels detector 424 and the AND gate 425, and coupling the output of the comparator 420 to the HOLD latch 430.

It will also be appreciated that in yet another embodiment of the invention, the peak and valley detector 405, the adder 410, the switch 415, the absolute value generator 418, and the comparator could be analog circuits. In this case of course, the detected signal 440 would be analog, and the output signal (called the digitally frequency corrected signal 460 above) would be more aptly named a frequency corrected signal. The correction circuit in accordance with the preferred and alternative embodiments of the present invention is described herein as an automatic frequency correction circuit.

It will be further appreciated that the frequency correction circuit has application in any electronic equipment having a receiver that operates in a communication system having the characteristics described herein above. Such electronic equipment could include, for example, an optical receiver.

Thus, it can be seen that an automatic frequency correction method and circuit are provided in accordance with the preferred and alternative embodiments of the present invention that improve receiving sensitivity in a radio that has an IF filter designed to receive an FM digital signal that can have two levels of modulation or more than two levels of modulation, wherein the modulation index of the two level signals is relatively high (3 or more in the preferred embodiment).

We claim:

1. A method for automatic frequency correcting a frequency modulated (FM) digital signal that includes a preamble portion followed by a remainder portion, comprising the steps of:

generating a detected FM signal from the FM digital signal;

determining a frequency offset value of the detected FM signal during this preamble portion of the FM digital signal;

generating an offset corrected signal by removing the frequency offset values from the detected FM signal; and generating a frequency corrected signal, comprising the steps of
selecting the offset corrected signal during the preamble portion,
selecting the detected FM signal during the remainder portion when a magnitude of the frequency offset value of the detected FM signal is below a predetermined threshold, and
otherwise selecting the offset corrected signal during the remainder portion.

2. The method according to claim 1, further comprising the step of:

determining a number of frequency shift modulation levels, M, during the preamble portion; and
wherein in said step of selecting the detected FM signal during the remainder portion, the detected FM signal is selected only when M is 2 and the magnitude of the frequency offset value of the detected FM signal is below the predetermined threshold.

3. The method according to claim 1, wherein the FM signal is modulated using the FLEX™ protocol.

4. An automatic frequency correction circuit that frequency corrects a frequency modulated (FM) digital signal, comprising:
   a peak and valley detector that generates a frequency offset value of an detected FM signal during a preamble portion of the FM digital signal;
   an adder, coupled to the peak and valley detector and to the detected FM signal, that generates an offset corrected signal by removing the frequency offset value from the detected FM signal;
   an absolute value generator, coupled to the peak and valley detector, that generates a magnitude of the frequency offset value;
   a comparator, coupled to the absolute value generator and a predetermined threshold;
   a hold latch, coupled to the comparator,
      wherein the hold latch unasserts a control signal during the preamble portion of the FM digital signal, and
      wherein the hold latch asserts the control signal after the preamble portion of the FM digital signal when the magnitude is below the predetermined threshold after the preamble portion, and
      wherein the hold latch otherwise unasserts the control signal after the preamble portion; and
   a switch, coupled to the detected FM signal, the adder, and the control signal, that selects the detected FM signal to be a frequency corrected signal when the control signal is asserted and selects the offset corrected signal to be the frequency corrected signal when the control signal is unasserted.

5. The automatic frequency correction circuit according to claim 3, further comprising:
   a modulation levels detector that determines a number of frequency shift modulation levels, M, during the preamble portion; and
   a logic gate coupled to the comparator, the modulation levels detector, and the hold latch,
      wherein the hold latch unasserts a control signal during the preamble portion, and
      wherein the hold latch asserts the control signal after the preamble portion of the FM digital signal when M is 2 and the magnitude is below the predetermined threshold after the preamble portion, and
      wherein the hold latch otherwise unasserts the control signal after the preamble portion.

6. The automatic frequency correction circuit according to claim 4, comprising a single integrated circuit implemented as a state machine, wherein the detected FM signal, the offset corrected signal, the frequency offset value, and the frequency corrected signal are each a series of digital samples and the peak and valley detector, the adder and the switch are digital circuits.

7. An electronic equipment having a receiver comprising an automatic frequency correction circuit for frequency correcting a frequency modulated (FM) digital signal that includes a preamble portion followed by a remainder portion, comprising:
   a receiver that generates a detected FM signal from the FM digital signal;
   a processor controlled by stored program instructions, that
      determines a frequency offset value of the detected FM signal during the preamble portion;
      generates an offset corrected signal by removing the frequency offset value from the detected FM signal
      generates a frequency corrected signal, by
         selecting the offset corrected signal during the preamble portion,
         selecting the detected FM signal during the remainder portion when a magnitude of the frequency offset value of the detected FM signal is below a predetermined threshold, and
         otherwise selecting the offset corrected signal during the remainder portion.

8. An automatic frequency correction circuit for frequency correcting a frequency modulated (FM) digital signal that includes a preamble portion followed by a remainder portion, comprising:
   a receiver that generates a detected FM signal from the FM digital signal;
   a processor controlled by stored program instructions, that
      determines a frequency offset value of the detected FM signal during the preamble portion;
      generates an offset corrected signal by removing the frequency offset value from the detected FM signal
      generates a frequency corrected signal, by
         selecting the offset corrected signal during the preamble portion,
         selecting the detected FM signal during the remainder portion when a magnitude of the frequency offset value of the detected FM signal is below a predetermined threshold, and
         otherwise selecting the offset corrected signal during the remainder portion.

9. The automatic frequency correction circuit according to claim 7, wherein the processor is further controlled by stored program instructions such that the processor:
   determines a number of frequency shift modulation levels, M, during the preamble portion of the FM digital signal, and
   wherein when said processor selects the detected FM signal during the remainder portion, the detected FM signal is selected only when M is 2 and the magnitude of the frequency offset value of the detected FM signal is below the predetermined threshold.

* * * * *